United States Patent [19]

Mochizuki et al.

[11] Patent Number: 4,972,513
[45] Date of Patent: Nov. 20, 1990

[54] MULTI-POINT OPTICAL AMPLIFICATION REPEATING SYSTEM

[75] Inventors: Kiyofumi Mochizuki, Hachioji; Noboru Edagawa, Tokyo; Yoshinao Iwamoto, Minabekawa, all of Japan

[73] Assignee: Kokusai Denshin Denwa Kabushiki Kaisha, Tokyo, Japan

[21] Appl. No.: 222,193

[22] Filed: Jul. 21, 1988

[30] Foreign Application Priority Data

Jul. 23, 1987 [JP] Japan .................................. 62-182240
Jul. 23, 1987 [JP] Japan .................................. 62-182241

[51] Int. Cl.$^5$ ............................................. H04B 10/12
[52] U.S. Cl. ................................. 455/601; 350/96.16; 370/1; 455/612
[58] Field of Search ............... 455/600, 601, 602, 606, 455/607, 610, 612; 370/1, 3; 350/96.16, 96.19

[56] References Cited

U.S. PATENT DOCUMENTS 4,778,238 10/1988 Hicks .................................. 370/3

Primary Examiner—Joseph A. Orsino
Assistant Examiner—L. VanBeck
Attorney, Agent, or Firm—Emmanuel J. Lobato; Robert E. Burns

[57] ABSTRACT

A multi-point optical amplification repeating system is disclosed in which an output of a unidirectional amplifier inserted in a unidirectional repeating optical transmission system is branched and coupled to an input of a unidirectional amplifier inserted in another unidirectional repeating optical transmission system, so that bidirectional optical communication can be performed between many points connected to a plurality of first optical transmission lines. If a bidirectional amplifier is employed in a bidirectional repeating optical transmission system, the above bidirectional optical communication can be also realized by fed back the first port of the bidirectional amplifier to the second port thereof through an optical isolator.

6 Claims, 5 Drawing Sheets

MULTI-POINT OPTICAL AMPLIFICATION REPEATING SYSTEM

BACKGROUND OF THE INVENTION

The present invention relates to a repeating system in an optical transmission system.

Optical fiber communication systems now in use utilize, as a repeating method, an optical-to-electric-to-optical conversion which involves converting an optical signal into an electric signal, amplifying and waveform-shaping the electric signal, and driving again a semiconductor laser with the amplified electric signal.

On the other hand, there has been proposed, as a new repeating method, an optical amplification method which directly amplifies an optical signal. The repeating system utilizing the optical amplification is advantageous over the conventional optical-to-electric-to-optical conversion repeating system in that repeating circuits used are simplified and that a wavelength multiplex signal and a frequency multiplex signal at a given transmission rate can be amplified collectively by one optical amplifier. Furthermore, since an amplifier gain is fixed regardless of the direction of incidence of light, optical signals in two ways can be amplified together by one optical amplifier.

The optical amplification is performed chiefly by a method using a semiconductor laser and an optical fiber Raman amplification method utilizing stimulated Raman scattering which occurs in an optical fiber. Up to now many results of studies have been reported on amplification characteristics and noise characteristics of these optical amplification methods.

Concerning the direct optical amplification system it is now predicted theoretically that a maximum amplifier gain of 30 to 40 dB is obtainable and that a signal can be transmitted, in the form of light, over 10,000 km without being affected by a background light noise caused by spontaneous scattered light, the practicality of this system as a future optical repeating system is becoming higher (IEEE. J. lightwave Tech., Vol. LT-4, pp. 1328-1333 and IEEE. J. Quantum Electron. Vol. QE-17, pp. 919-935). When this optical repeating system is put into practical use, an optical cable having a repeater will be considered as a mere optical transmission line just like a nonrepeating optical cable, and the combination of this system and an optical branching technique will make possible a multi-point communication in which a frequency (or wavelength) is allocated to each section between respective points. To permit communication between any points, it is necessary, in this instance, that signals transmitted to a branching point from respective points be turned back thereto.

SUMMARY OF THE INVENTION

Another object of the present invention is to provide a multi-point, optical-amplification repeating system employing a unidirectional optical transmission system by which the multi-point communication, with a frequency (or wavelength) allocated to each section between respective points, can easily be carried out in a multi-point optical communication system having optical-amplifying repeaters.

An object of the present invention is to provide a multi-point, optical-amplification repeating system employing a bidirectional optical transmission system by which the multi-point communication, with a frequency (or wavelength) allocated to each section between respective points, can easily be carried out in a multi-point optical communication system having optical-amplifying repeaters.

The multi-point, optical amplification repeating system employing unidirectional optical transmission systems according to the present invention is provided with a pair of optical branches so connected as to transmit optical signals of plural pairs of first optical transmission lines to a pair of second optical transmission lines and transmit optical signals of the pair of second optical transmission lines to the plural pairs of first optical transmission lines, a pair of unidirectional optical amplifiers provided in the pair of second optical transmission lines, respectively, for amplifying unidirectional optical signals in opposite direction, and a pair of optical couplers for applying the input or output light of one of the pair of optical amplifiers to the input or output of the other optical amplifier, whereby bidirectional optical communications can be performed between many points connected to the plural pairs of first optical transmission lines and the pair of second optical transmission lines.

The multi-point, optical-amplification repeating system employing a bidirectional transmission system according to the present invention is provided with an optical branch so connected as to transmit optical signals of a plurality of first optical transmission lines to a second optical transmission line and transmit an optical signal of the second optical transmission line to the plurality of first optical transmission lines, a branch for branching the optical signal of the second optical transmission line to a first optical branch line and a second optical branch line which serves as a principal transmission line of the second optical transmission line, a bidirectional optical amplifier inserted in the second optical branch line, an optical isolator inserted in the first optical branch line, and an optical coupler inserted in the first optical branch line so that the output light of the optical isolator is amplified by the bidirectional optical amplifier in an opposite direction, whereby bidirectional optical communication can be achieved between many points connected to the plurality of first optical transmission lines.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, an example of conventional unidirectional optical transmission systems will first be described.

Figure 1:
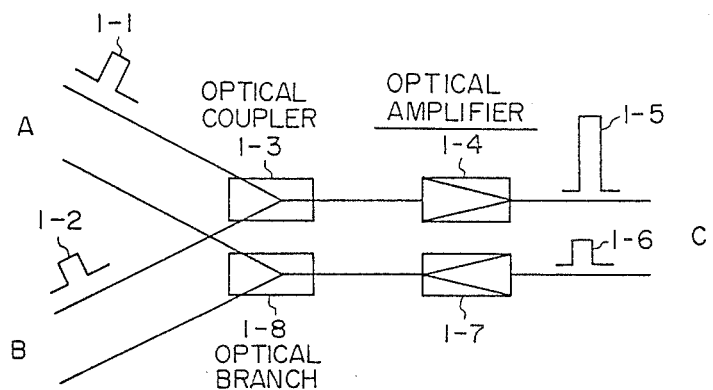
FIG. 1 is a block diagram showing an example of the arrangement of a conventional unidirection optical transmission system.

FIG. 1 shows an optical branching system for use in the repeating system utilizing the optical amplification method. In FIG. 1, an optical signal 1-1 from a point A is coupled, by a fiber coupler or similar optical coupler 1-3, with an optical signal 1-2 from a point B. The coupled output optical signal is applied to an optical amplifier 1-4, wherein it is amplified, and the amplified optical signal 1-5 propagates toward a point C. Conversely, an optical signal 1-6 from the point C is amplified by an optical amplifier 1-7 and branched by an optical branch 1-8 into two optical signals, which propagate toward the points A and B, respectively. In this case, communication is possible between the points A and C and between B and C but impossible between A and B.

Next, the present invention will be described in detail with reference to the accompanying drawings.

Figure 2:
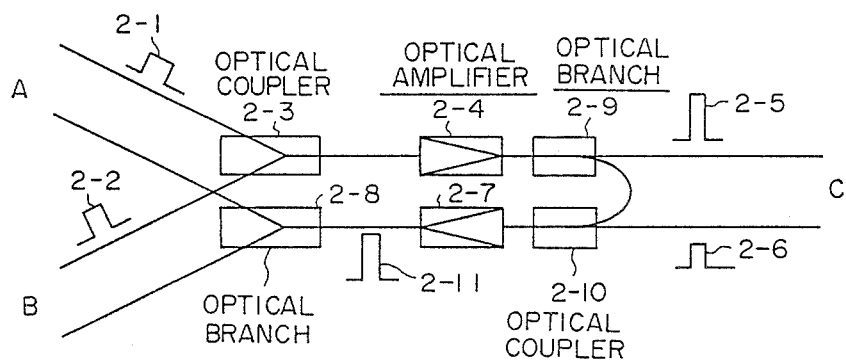
FIGS. 2, 3, 4, 5 and 6 are block diagrams illustrating embodiments of the present invention.

The present invention permits communication between any points through optical branching. FIG. 2 illustrates the principal constitution of the system of the present invention. An optical signal 2-1 from a point A is coupled, by an optical coupler 2-3, to an optical signal 2-2 from a point B. Then the coupled optical signal is amplified by an optical amplifier 2-4. The amplified optical signal is branched by a branch 2-9 into two; one signal 2-5 propagates toward a point C and the other signal is coupled, by an optical coupler 2-10, to an optical signal 2-6 from the point C and applied to an optical amplifier 2-7, wherein it is amplified. The amplified optical signal 2-11 is branched by an optical branch 2-8 into two signals, which propagate toward the points A and B, respectively. At the points A, B and C the frequency (or wavelength) allocated to each of them can be received, without interference, through use of an optical filter or optical frequency tuning technique. (With the coherent optical communication system utilizing the property of light that it is a wave, the frequency tuning technique can be employed as is the case with the radio communication system.) That is to say, the present invention enables communications between the points A and C, between B and C and between A and B.

Figure 3:
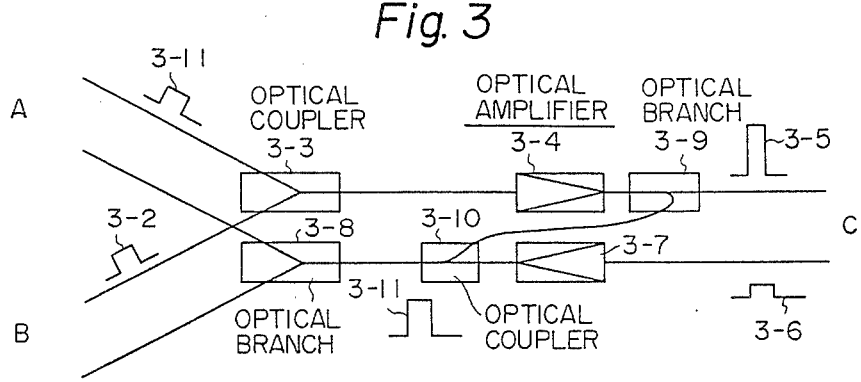
Figure 4:
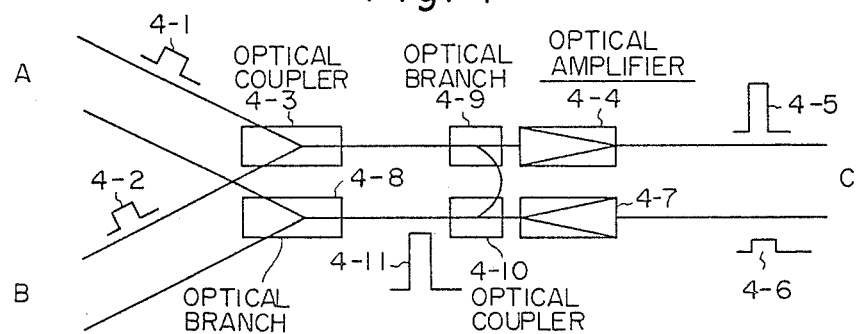
Figure 5:
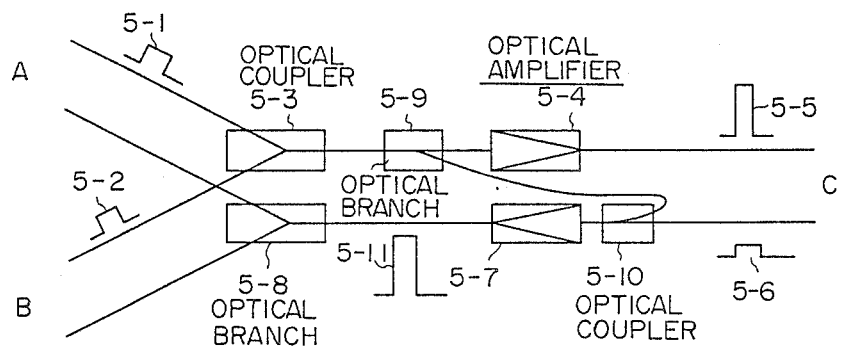

FIGS. 3 through 5 illustrate other embodiments of the present invention. The embodiment depicted in FIG. 3 is identical with the embodiment of FIG. 2 except that one of branched optical signal is coupled, by an optical coupler 3-10, to another optical signal 3-6 amplified by an optical amplifier 3-7.

The embodiment shown in FIG. 4 is identical with the embodiment of FIG. 2 except that an optical signal is branched by an optical branch 4-9 at a stage preceding an optical amplifier 4-4 and is then coupled, by an optical coupler 4-10, to the output signal from an optical amplifier 4-7.

The embodiment shown in FIG. 5 is identical with the embodiment of FIG. 2 except that an optical signal is branched by an optical branching filter 5-9 at a stage preceding an optical amplifier 5-4.

Figure 6:
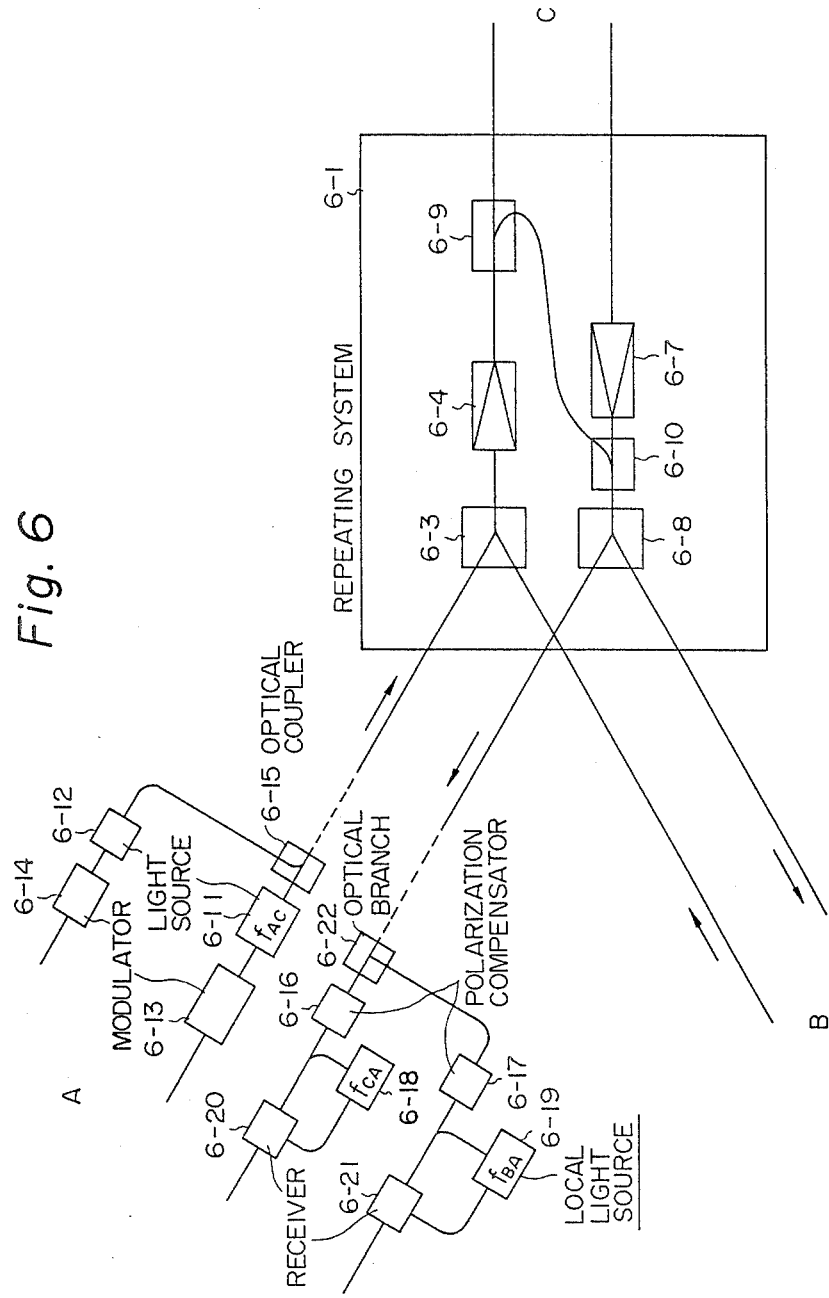

FIG. 6 illustrates an embodiment of the present invention as being applied to a frequency division multiplex communication system using the coherent optical communication system. The coherent optical communication system is a method which modulates the frequency or phase of light by a signal, and the frequency division multiplex communication system can be implemented through use of this method. In this system, frequencies $f_{AC}$ and $f_{CA}$ are used as optical frequencies for communication from the point A to C and from the point C to A, respectively. Similarly, frequencies $f_{BC}$, $f_{CB}$, $f_{AB}$ and $f_{BA}$ are preset as optical frequencies for communication between the points B and C and between the points A and B. A signal from the point A to C is sent out from a light source 6-11 of the center frequency $f_{AC}$ which is modulated by a modulator 6-13. A signal to the point B is sent out from a light source 6-12 of the center frequency $f_{AB}$ which is modulated by a modulator 6-14. The two optical signals thus sent out are coupled together by an optical coupler 6-15 such as an optical fiber coupler, and then the coupled signal is transmitted.

On the other hand, a signal from the point C to A is transmitted to the latter via a repeating system 6-1 of the present invention. In the coherent optical communication system, since it is desirable that signal light and locally-emitted light be of the same polarization, the polarization of the signal light is adjusted by a polarization compensator 6-16 into agreement with the polarization of the local light source 6-18. By tuning the center frequency of the local light source 6-18 to the center frequency $f_{CA}$ of the signal light from the point C, the signal from the point C can be received by a receiver 6-20. In the case of a semiconductor laser, the center frequency of its output light can be varied by changing the current that is injected into the laser. A signal from the point B to A is turned by the repeating system 6-1 back to the point A. At the point A, by tuning the center frequency of a local light 6-19 to the center frequency $f_{BA}$ of the signal light from the point B, the signal from the point B can be received by a receiver 6-21.

The above description has been given of the transmitting and receiving systems of the point A, and the same is true of transmitting and receiving systems of the points B and C. Although this embodiment has been described as being applied to the communication between three points, it can also be applied to the communication between more than three points. In this example the polarization compensators 6-16 and 6-17 are disposed separately, but it is also possible to perform the polarization compensation at the stage preceding an optical branch 6-22. Moreover, the polarization compensation may also be replaced with compensation by a polarization diversity system.

The present invention can be applied to bidirectional optical transmission systems.

Figure 7:
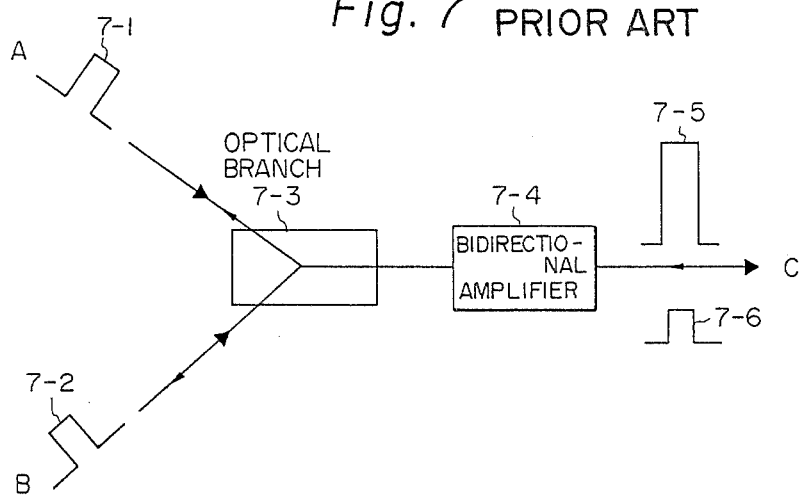
FIG. 7 is a block diagram showing an example of the arrangement of a conventional bidirectional optical transmission system.

FIG. 7 shows an optical branching system for use in a conventional repeating system utilizing a bidirectional optical amplification method. In FIG. 7, an optical signal 7-1 from a point A is coupled, by a fiber coupler or similar optical coupler 7-3, with an optical signal 7-2 from a point B. The coupled output optical signal is applied to an optical amplifier 7-4, wherein it is amplified, and the amplified optical signal 7-5 propagates toward a point C. Conversely, an optical signal 7-6 from the point C is amplified by an optical amplifier 7-4 and branched by an optical branch 7-3 into two optical signals, which propagate toward the points A and B, respectively. In this case, communication is possible between the points A and C and between B and C but impossible between A and B.

Figure 8:
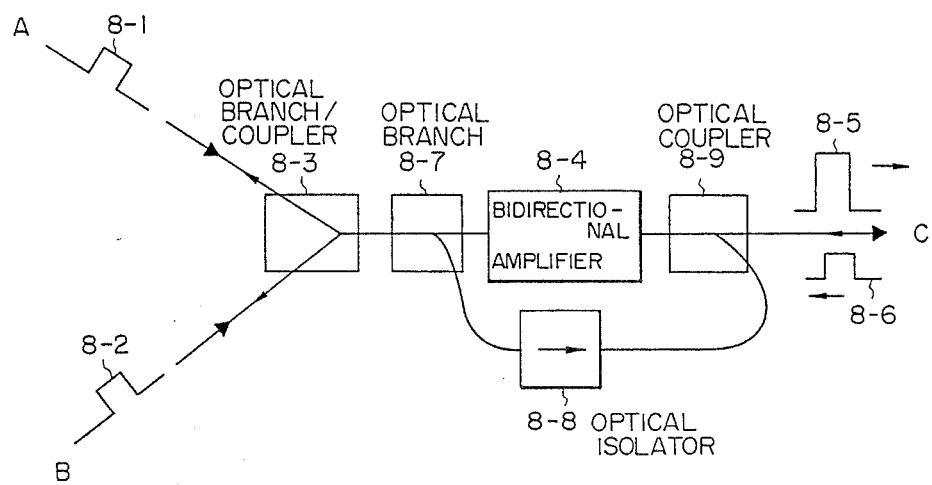
FIGS. 8 and 9 are block diagrams illustrating embodiments of the present invention.

The present invention permits communication between any points through an optical branching. FIG. 8 illustrates the principal constitution of the system of the present invention using a bidirectional amplifier. An optical signal 8-1 from a point A is coupled, by an optical coupler 8-3, to an optical signal 8-2 from a point B. Then the coupled optical signal is branched, by a fiber coupler or similar optical branch 8-7, into two, one of which is amplified by an optical amplifier 8-4 and then propagates, as a signal 8-5, to a point C and the other of which is coupled, by an optical coupler 8-9, to an optical signal 8-6 from the point C and then applied to the optical amplifier 8-4. The amplified optical signal is branched by the optical coupler at optical branch 8-3 into two signals, which are provided to the points A and B, respectively. With the coherent optical communication system utilizing the property of light that it is a wave, the frequency tuning technique can be employed as is the case with the radio communication system. At the points A, B and C the frequency (or wavelength) allocated to each of them can be received, without interference, through use of an optical filter or optical frequency tuning technique. That is, the present invention enables communications between the points A and C, between B and C and between A and B.

Figure 9:
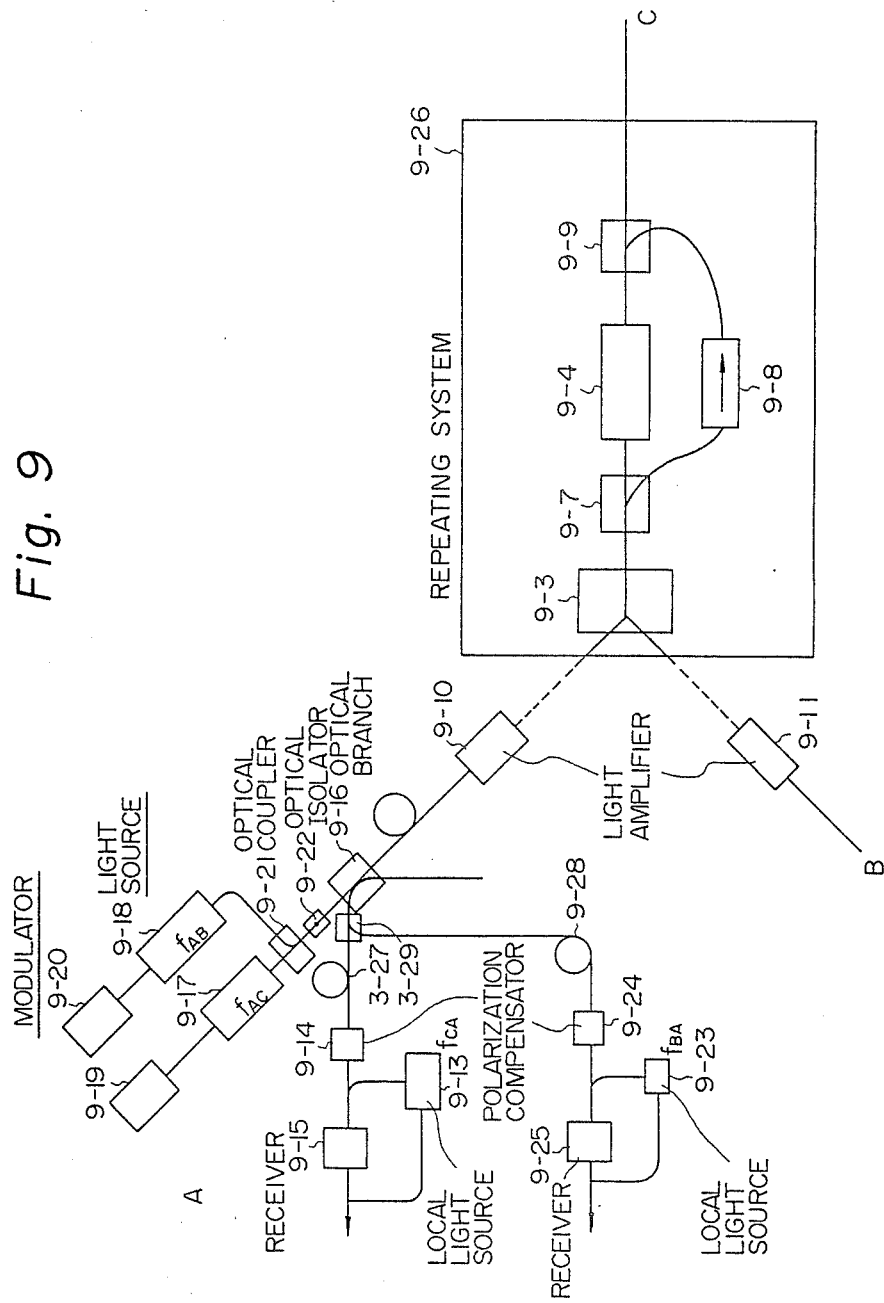

FIG. 9 illustrates an embodiment of the present invention as being applied to a frequency division multiplex communication system using the coherent optical communication system. The coherent optical communication system is a method which modulates the frequency or phase of light by a signal, and the frequency division multiplex communication system can be implemented through use of this method. In this system, frequencies $f_{AC}$ and $f_{CA}$ are used as optical frequencies for communication from the point A to C and from the point C to A, respectively. Similarly, frequencies $f_{BC}$, $f_{CB}$, $f_{AB}$ and $f_{BA}$ are preset as optical frequencies for communication between the points B and C and between A and B. A signal from the point A to C is sent out from a light source 9-17 of the center frequency $f_{AC}$ which is modulated by a madulator 9-19.

A signal to the point B is sent out from a light source 9-18 of the center frequency $f_{AB}$ which is modulated by a modulator 9-20. The two optical signals thus sent out are coupled together by an optical coupler 9-21 such as an optical fiber coupler, and then the coupled signal is transmitted via an optical isolator 9-22.

On the other hand, a signal from the point C to A is transmitted via a repeating system 9-26 of the present invention to the point A after being amplified by an optical amplifier 9-10. At the point A the signal light is branched by an optical branch 9-16 to optical fibers 9-27 and 9-28 at the receiving side. The polarization of the signal light having propagated in the optical fiber 9-27 is adjusted by a polarization compensator 9-14 into agreement with the polarization of a local light emitting source 9-13. By tuning the center frequency of the local light emitting source 9-13 to the center frequency $f_{CA}$ of the signal light from the point C, the transmitted signal can be received with a receiver 9-15. In the case of a semiconductor laser, the center frequency of its output light can be varied by changing the current that is injected into the laser. A signal from the point B to C is turned by the repeating system 9-26 of the present invention back to the point A. At the point A, the signal from the point B can be received by a receiver 9-25 through tuning of the center frequency of a local emitting light source 9-23 to the center frequency $f_{BA}$ of the signal light from the point B.

The above description has been given of the transmitting and receiving systems of the point A, and the same is true of transmitting and receiving systems of the points B and C. Although this embodiment has been described as being applied to the communication between three points, it can also be applied to the communication between more than three points. In this example the polarization compensators 9-14 and 9-24 are provided separately, but it is also possible to perform the polarization compensation between the optical branches 9-29 and 9-16. Moreover, the polarization compensation may also be replaced with compensation by a polarization deversity system. Besides, the optical isolator 9-22 may also be substituted with an optical filter which permits the passage therethrough of the optical signals 9-17 and 9-18 alone.

For the optical amplifiers 8-4, 9-4, 9-10 and 9-11 which are used in the present invention, the "optical amplification system" can be utilized which is proposed in an application (Japan. Pat. Appln. No. 182240/87) filed by the present inventor under the same data as this application.

As described above, according to the present invention, the bidirectional wavelength (frequency) multiplex communication can be achieved between many points. In the present invention the optical isolator 8-8 is to prevent the influence of re-coupling of two branched optical signals by the optical coupler 8-7, but the optical isolator 8-8 can be omitted when this influence is slight. While in the above the present invention has been described in connection with the communication between three points, the invention can equally be applied to the communication among more points.

What we claim is:

1. A multi-point, optical amplification repeating system having plural pairs of first optical transmission lines and a pair of second optical transmission lines, said pair of second optical transmission lines each operating unidirectionally and comprising, a pair of optical branches connected to transmit optical signals of said plural pairs of first optical transmission lines to said pair of said second optical transmission lines and to transmit optical signals of said pair of second optical transmission lines to one pair of the plural pairs of first optical transmission lines, a pair of unidirectional optical amplifiers inserted in opposite directions in said pair of said second optical transmission lines, respectively, for amplifying unidirectional optical signals, and a pair of optical couplers for coupling one line of the pair of said second optical transmission lines to the other line of the pair of said second optical transmission lines, whereby bidirectional optical communications can be performed between many points connected respectfully to the plural pairs of first optical transmission lines and the one pair of said second optical transmission lines.

2. A multi-point, optical amplification repeating system according to claim 1, in which the pair of said optical couplers are inserted in the pairs of said second optical transmission lines, and including an optical fiber line to couple the output of one of the pair of unidirectional optical amplifiers to the output of the other of the pair of unidirectional optical amplifiers.

3. A multi-point optical amplification repeating system according to claim 1, in which the pair of said optical couplers are inserted in the pair of said second optical transmission lines, and including an optical fiber line to couple the input of one of the pair of unidirectional optical amplifiers to the input of the other of the pair of unidirectional optical amplifiers.

4. A multi-point, optical amplification repeating system according to claim 1, in which the pair of said optical couplers are inserted in the pair of said second optical transmission lines, and including an optical fiber line to couple the input of one of the pair of unidirectional optical amplifiers to the output of the other of the pair of unidirectional optical amplifiers.

5. A multi-point optical amplification repeating system according to claim 1, in which a pair of said optical couplers are inserted in the pairs of said second optical transmission lines, and including an optical fiber line to couple the output of one of the pair of unidirectional optical amplifiers to the input of the other of the pair of unidirectional optical amplifiers.

6. A multi-point, optical-amplification repeating system having a plurality of first optical transmission lines and a second optical transmission line using a bidirectional transmission system, comprising an optical branching filter connected to transmit optical signals of the plurality of first optical transmission lines to the second optical transmission line and to transmit an optical signal of the second transmission line to the plurality of first optical transmission lines, an optical branch for branching the optical signal of the second optical transmission line into a first optical branch line and a second optical branching line effective as a principal transmission line of the second optical transmission line, a bidirectional optical amplifier inserted in the second optical branch line, an optical isolator inserted in the first optical branch line, and an optical coupler inserted in the first optical branch line so that output light of the optical isolator is fed back to the bidirectional optical amplifier, whereby bidirectional optical communication can be performed between many points connected to the plurality of first optical transmission lines and the second optical transmission line.

* * * * *